United States Patent
Jang et al.

(10) Patent No.: US 7,155,098 B2
(45) Date of Patent: Dec. 26, 2006

(54) METHOD OF MANUFACTURING OPTICAL FIBER PREFORM USING MODIFIED CHEMICAL VAPOR DEPOSITION INCLUDING DEHYDRATION AND DECHLORINATION PROCESS AND OPTICAL FIBER MANUFACTURED BY THE METHOD

(75) Inventors: Ki-Wan Jang, Seoul (KR); Lae-Hyuk Park, Seoul (KR); Chan-Joo Lee, Seoul (KR)

(73) Assignee: L.G. Cable Ltd., Seoul (KR)

( * ) Notice: Subject to any disclaimer, the term of this patent is extended or adjusted under 35 U.S.C. 154(b) by 173 days.

(21) Appl. No.: 10/502,455

(22) PCT Filed: Aug. 20, 2003

(86) PCT No.: PCT/KR03/01678

§ 371 (c)(1),
(2), (4) Date: Jul. 23, 2004

(87) PCT Pub. No.: WO2004/018374

PCT Pub. Date: Mar. 4, 2004

(65) Prior Publication Data

US 2005/0152653 A1    Jul. 14, 2005

(30) Foreign Application Priority Data

Aug. 20, 2002 (KR) .................... 10-2002-0049108

(51) Int. Cl.
*G02B 6/02* (2006.01)
(52) U.S. Cl. ...................... 385/123; 385/127
(58) Field of Classification Search ........ 385/123–128; 65/385, 414, 416, 417, 419, 426, 427, 428, 65/424
See application file for complete search history.

(56) References Cited

U.S. PATENT DOCUMENTS

| | | |
|---|---|---|
| 3,737,292 A | 6/1973 | Keck et al. |
| 3,823,995 A | 7/1974 | Carpenter |
| 3,884,550 A | 5/1975 | Carpenter |
| 4,338,111 A | 7/1982 | Edahiro et al. ............. 65/18.2 |
| 4,737,179 A | 4/1988 | Tanaka et al. |
| 5,397,372 A | 3/1995 | Partus et al. |

(Continued)

FOREIGN PATENT DOCUMENTS

EP    1 104 891 A1    6/2001

(Continued)

OTHER PUBLICATIONS

Chmel et al., "Si-Cl groups in chlorine-impregnated silica," Journal of Non-Crystalline Solids 195 (1996) 176-179.

*Primary Examiner*—Kevin S. Wood
(74) *Attorney, Agent, or Firm*—Jones Day

(57) ABSTRACT

Disclosed is a method of manufacturing an optical fiber perform using MCVD including dehydration and dechlorination, which executes the following process repeatedly with changing the composition of soot generation gas according to the refractive index profile, the process including the steps of: forming a soot layer having pores on an inner wall of a deposition tube at a temperature lower than the soot sintering temperature with putting soot generation gas and oxygen gas into the rotating deposition tube; removing hydroxyl groups with keeping the pores by putting dehydration gas into the deposition tube; removing chlorine impurities existing in the soot layer with keeping the pores by putting dehydration gas into the deposition tube; and sintering the soot layer by heating the deposition tube at a temperature over the soot sintering temperature.

18 Claims, 5 Drawing Sheets

U.S. PATENT DOCUMENTS

| | | |
|---|---|---|
| 6,131,415 A | 10/2000 | Chang et al. |
| 6,289,161 B1 | 9/2001 | Schotz et al. |
| 6,578,387 B1 * | 6/2003 | Tankala .................. 65/390 |
| 6,732,551 B1 * | 5/2004 | Tennent et al. ............ 65/414 |
| 2003/0221459 A1 * | 12/2003 | Walczak .................. 65/398 |

FOREIGN PATENT DOCUMENTS

| | | |
|---|---|---|
| JP | 58-217441 | 12/1983 |
| JP | 63-17229 | 1/1988 |
| JP | 63-285137 | 11/1988 |
| JP | 63-315530 | 12/1988 |
| JP | H04-260632 | 9/1992 |
| JP | 08-2900931 | 5/1996 |
| JP | S63-017229 | 1/1998 |
| JP | 63285137 A | 11/1998 |
| JP | 2000-191336 | 7/2000 |
| JP | 2000-327360 | 11/2000 |
| JP | 2001-089160 | 4/2001 |
| KR | 08-2002-0029529 | 4/2002 |

* cited by examiner (c)

__US 7,155,098 B2__

METHOD OF MANUFACTURING OPTICAL FIBER PREFORM USING MODIFIED CHEMICAL VAPOR DEPOSITION INCLUDING DEHYDRATION AND DECHLORINATION PROCESS AND OPTICAL FIBER MANUFACTURED BY THE METHOD

TECHNICAL FIELD

The present invention relates to a method of manufacturing an optical fiber preform using the Modified Chemical Vapor Deposition (MCVD) including dehydration and dechlorination processes and an optical fiber manufactured by the method, and more particularly to a method of manufacturing an optical fiber perform which is capable of controlling concentration of hydroxyl group and chlorine impurities, which may cause optical loss when clad and core are deposited on an inside of a deposition tube by MCVD, and an optical fiber manufactured by the method.

BACKGROUND ART

The Modified Chemical Vapor Deposition (MCVD) is one of optical fiber manufacturing methods. In the MCVD, a clad is firstly formed, and then a core is formed inside the clad.

To describe the conventional MCVD in more detail with reference to FIG. 1, a deposition tube 1 made of silicon oxide is put on lathe (not shown), and then soot generation gas pertaining to halide such as $SiCl_4$, $GeCl_4$ and $POCl_3$ is blown into the deposition tube 1 together with oxygen gas while rotating the deposition tube 1. At the same time, a flame providing unit 2 such as a flame burner or a torch is periodically reciprocated along the axial direction of the deposition tube 1 to heat the deposition tube 1 higher than 1600° C. so that the soot generation gas flowed into the tube 1 is sufficiently reacted with the oxygen gas.

Whenever the flame providing unit 2 reciprocates once, the oxidization reaction of the soot generation gas as expressed in the following Reaction Formula 1 is generated in a part of the deposition tube 1 right above the flame, thereby generating soot 3 composed of fine particles. As the flame providing unit 2 advances, the soot 3 is deposited on an inner surface of the deposition tube 1 at an area which is not yet heated, by means of the thermophoresis.

Reaction Formula 1

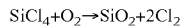

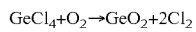

The layer of soot 3a deposited on the inner surface of the deposition tube 1 is sintered by the heat of the flame providing unit 2 adjacently followed and becomes a transparent glass layer having a predetermined thickness.

The soot forming, depositing and sintering processes are continuously repeated according to a predetermined process condition, and thus a plurality of clad layers and core layers are formed in a direction of the central axis of the deposition tube 1, thereby making an optical fiber perform. At this time, because the clad and the core should have different indexes of refraction, composition of the soot generation gas flowed into the deposition tube 1 is controlled according to the refractive index profile of the optical fiber perform to be made. As shown in FIG. 2, the optical fiber perform made as above has a deposition tube 7 on the outermost position, and a clad 6 having a diameter (D) and a core 5 having a diameter (d) inside the deposition tube 7.

An optical fiber is manufactured through the collapsing process and the drawing process of the optical fiber preform. Transmission through the optical fiber manufactured as above is conducted in the wavelength range of 1310 nm to 1550 nm. In order to ensure reliable signal transmission through the optical fiber, an optical loss of the optical fiber should be controlled lower than a predetermined level in the above wavelength range.

The optical loss, which is most essential for the optical fiber, is composed of the Rayleigh scattering loss caused by of density difference and constitution difference of the optical fiber preform, the ultraviolet absorption loss according to electronic transition energy absorption in atom level, the infrared absorption loss according to energy absorption during lattice vibration, the hydroxyl group absorption loss due to vibration of hydroxyl group and the macroscopic bending loss.

However, in case of the optical fiber drawn from the optical fiber preform manufactured by the MCVD, among the above-mentioned various losses, the hydroxyl group absorption loss and the Rayleigh scattering loss are meaningfully caused, so these losses should be suitably controlled.

More specifically, when making an optical fiber preform using the conventional MCVD, a small amount of moisture exists in the deposition tube 1 as impurities. This moisture may be flowed into the deposition tube 1 together with the soot generation gas. In some cases, moisture derived from the combustion reaction in the flame providing unit 2 may be dispersed through a surface of the deposition tube 1 or minute leaks.

The moisture existing in the deposition tube 1 is physically or chemically absorbed on the surface of the soot 3 as shown in FIG. 3 during the execution of MCVD, thereby generating Si—OH bond. However, since the deposition and sintering of the soot 3 are achieved approximately at the same time in the conventional MCVD, the pores of the soot layer 3a, which is possibly used as a dispersion route for removing impurities, are clogged due to the sintering of the soot layer 3a, so the removal of the hydroxyl groups included in the soot 3 is nearly impossible.

As well known in the art, the hydroxyl group chemically bonded to Si in the soot 3 causes absorption loss due to the vibration of hydroxyl group in the wavelength of 1385 nm among the wavelength range for optical signal transmission, thereby deteriorating the optical signal transmission characteristic. Thus, the optical fiber is conventionally not used for optical fiber transmission in the wavelength range of 1340 nm~1460 nm around 1385 nm.

In order to use all the wavelength range of 1280 nm to 1620 nm, an optical loss in the wavelength of 1385 nm due to the hydroxyl group (OH) in the optical fiber should be lower than 0.34 dB/Km, which is an average optical loss at a wavelength of 1310 nm.

In case of the silica optical fiber, the core composed of germanium dioxide and silicon dioxide has a Rayleigh loss of about 0.28 dB/Km caused by the density and constitution difference of its material itself. Thus, if the absorption loss due to the hydroxyl group is controlled below 0.06 dB/Km (=0.34 dB/Km−0.28 dB/Km), the optical fiber can be used in the wavelength range of 1280 nm~1620 nm. By using the theoretical calculation, the concentration of hydroxyl group (OH) in the optical fiber should not be more than 1 ppb in order to control the absorption loss due to the hydroxyl group lower than 0.06 dB/Km. However, when only two hydroxyl groups exist on the surface of a particle of the soot 3 having a diameter of 1 μm, the concentration of hydroxyl group comes up to 30 ppb and 0.75 dB/Km, when being converted into ppb concentration and optical loss value. Therefore, it has been considered that the problem of absorption loss due to the hydroxyl group in the wavelength of 1385 nm is hardly solved.

It is known that an OH-free single mode optical fiber may be fabricated by using OVD (Outside Vapor Deposition) as disclosed in U.S. Pat. Nos. 3,737,292, 3,823,995 and 3,884,550, and using VAD (Vapor Axial Deposition) as disclosed in U.S. Pat. Nos. 4,737,179 and 6,131,415. However, as for MCVD, the technique to manufacture an OH-free single mode optical fiber is not yet reported except U.S. Pat. No. 5,397,372. In addition, U.S. Pat. No. 5,397,372 discloses a technique to manufacture an OH-free single mode optical fiber by using a plasma heat source, which is free from oxygen, but its applicability and industrial merit is very doubtful.

On the other hand, in the process of manufacturing an optical fiber preform using the conventional MCVD, chlorine gas is generated as a by-product by the oxidization reaction of the soot generation gas. In addition, the chlorine gas generated as a by-product is again reacted with moisture, which is an impurity existing in the deposition tube 1, so hydrogen chloride is also derived as another impurity.

However, the chlorine-related impurities such as chlorine gas or hydrogen chloride gas may remain in the preform in the shape of chlorine atom or molecule while the optical fiber preform is formed in the deposition tube. If the chloride remains in the optical fiber preform, the difference of refractive indexes of the core and the clad becomes increased, thereby causing that the Rayleigh scattering loss in the wavelength range of 1310 nm~1550 nm is as a whole increased (J. Non-Crystalline Solids, vol.195, 1996, pp. 176–179).

In addition, since the sintering of the soot layer 3a is conducted at a high temperature over 1600° C. in the MCVD as mentioned above, the solubility of chlorine contained in the soot layer 3a is decreased, thereby possibly causing fine foams in the optical fiber preform. These fine foams act as a factor of causing a microscopic bending loss of the optical fiber.

Thus, it is required in the MCVD to remove not only hydroxyl groups but also chlorine impurities remaining in the optical fiber preform.

DISCLOSURE OF INVENTION

The present invention is designed to solve the problems of the prior art, and therefore an object of the invention is to provide a method of manufacturing an optical fiber preform using an improved MCVD, which is capable of controlling the hydroxyl groups, which cause an optical absorption loss, and the chlorine impurities, which causes the Rayleigh scattering loss, below a predetermined level.

Another object of the invention is to provide an optical fiber, which has an expanded usable wavelength range more than a conventional optical fiber owing to a reduced Rayleigh scattering loss and shows no meaningful hydroxyl group absorption loss in a wavelength of 1385 nm.

In order to accomplish the above object, the present invention provides a method of manufacturing an optical fiber preform using MCVD (Modified Chemical Vapor Deposition) which forms a clad and a core in a deposition tube by using a flame providing unit reciprocating along an axial direction of the deposition tube, the method repeatedly executing the following process with varying composition of soot generation gas according to a refractive index profile, in which the process comprises the steps of: forming a soot layer having pores on an inner surface of the deposition tube by inducing soot generation reaction at a temperature lower than a soot sintering temperature with putting soot generation gas in a halide group together with oxygen gas into the deposition tube; removing hydroxyl groups existing in the soot layer with keeping the pores by putting dehydration gas into the deposition tube; removing chlorine impurities existing in the soot layer with keeping the pores by putting dechlorination gas into the deposition tube; and sintering the soot layer by heating the deposition tube at a temperature above the soot sintering temperature.

The sooting step is preferably accomplished at a temperature lower than 1600° C., and more preferably at a temperature selected in the range of 1400~1600° C.

The dehydration step is preferably accomplished at a temperature lower than 1200° C., and more preferably at a temperature selected in the range of 900~1200° C. At this time, a movement rate of the flame providing unit is preferably kept lower than 700 mm/min. Also preferably, the dehydration gas is chlorine gas, and the chlorine gas is mixed with inert carrier gas and then the mixed gas is supplied into the deposition tube.

The dechlorination step is preferably accomplished at a temperature higher than the process temperature of the dehydration step as much as 50° C. and lower than 1200° C., and a movement rate of the flame providing unit is preferably kept lower than 700 mm/min.

In the dechlorination step, the dechlorination gas may be oxygen gas, and the oxygen gas may be mixed with inert carrier gas and then the mixed gas is supplied into the deposition tube.

In the sintering step, gas for making oxidation condition is preferably put into the deposition tube together with dehydration gas in order to sinter the soot layer and remove residual hydroxyl groups in the soot layer at the same time. The sintering step is preferably accomplished at a temperature higher than 1700° C., and a movement rate of the flame providing unit is preferably kept lower than 700 mm/min.

A diameter ratio of the clad and the core (D/d) is preferably determined in the range of 2.0~2.5.

According to another aspect of the invention, there is provided an optical fiber of which a peak of hydroxyl group absorption loss at 1385 nm is less than 0.33 dB/Km, an optical loss at 1310 nm is less than 0.34 dB/Km, and an optical loss at 1550 nm is 0.20 dB/Km.

In this case, a concentration of hydroxyl group and chlorine impurities is preferably less than 1 ppb.

BRIEF DESCRIPTION OF THE DRAWINGS

These and other features, aspects, and advantages of preferred embodiments of the present invention will be more fully described in the following detailed description, taken accompanying drawings. In the drawings:

FIGS. 4a to 4d subsequently shows the method of manufacturing an optical fiber preform according to the present invention, in which FIG. 4a shows a sooting process, FIG. 4b shows a dehydration process, FIG. 4c shows a dechlorination process, and FIG. 4b shows a sintering process, respectively;

BEST MODES FOR CARRYING OUT THE INVENTION

Hereinafter, preferred embodiments of the present invention will be described in detail with reference to the accompanying drawings. First of all, terms and words used in the specification and the claims should be interpreted not in a limited normal or dictionary meaning, but to include meanings and concepts conforming with technical aspects of the present invention, based on the face that inventors may appropriately define a concept of a term to describe his/her own invention in a best way. Therefore, the configurations described in the specification and drawn in the figures are just most preferred embodiments of the present invention, not to show all of the technical aspects of the present invention. So, it should be understood that there might be various equalities and modifications to be replaced with them.

A method of manufacturing an optical fiber preform according to the present invention adopts MCVD (Modified Chemical Vapor Deposition), which forms a clad and a core in a deposition tube by repeatedly conducting a unit process including sooting, dehydration, dechlorination and sintering.

Figure 4A:
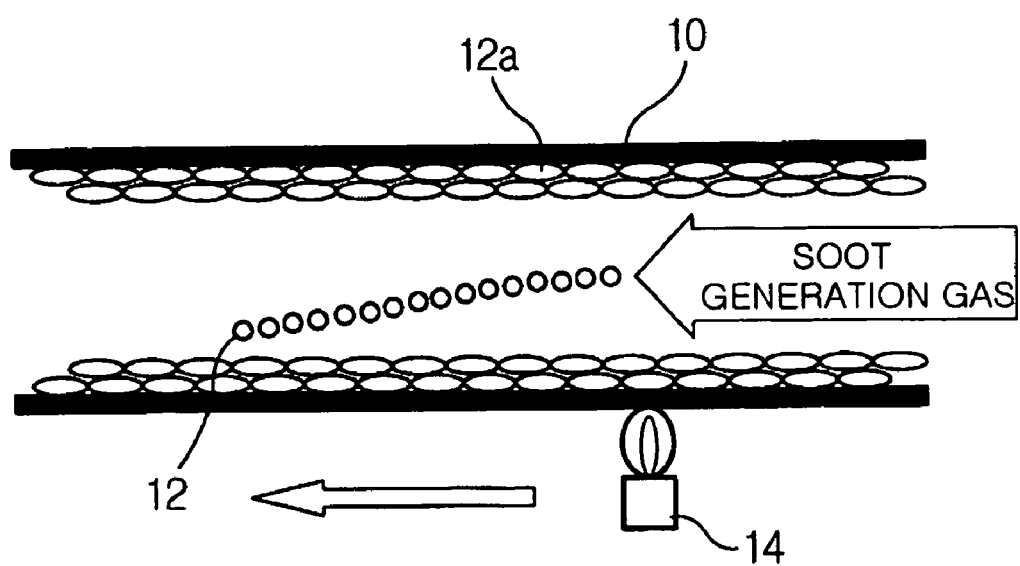

Specifically, FIG. 4a shows a sooting step for forming a soot layer 12a having pores on an inner surface of the deposition tube 10 in the method of manufacturing an optical fiber preform according to the present invention.

Referring to FIG. 4a, the deposition tube 10 made of silica oxide rotates with being put on a lathe (not shown). In addition, a flame providing unit 14 such as a burner or a torch is reciprocated out of the deposition tube 10 along an axial direction of the deposition tube 10.

In this step, soot generation gas such as $SiCl_4$, $GeCl_4$ and $PCl_3$ pertaining to halide is blown into the deposition tube 10 together with oxygen gas. At this time, the flame providing unit 14 gives flames upward for heating the deposition tube 10 positioned right below the flame providing unit 14 with reciprocating an axial direction of the deposition tube 10.

At a portion of the deposition tube 10 positioned right above the flame providing unit 14, powdered soots 12 are generated by means of oxidization reaction of the soot generation gas caused by heat. The generated soots 12 are moved toward and attached to the inner surface of a portion of the deposition tube 10, which is not yet heated, by means of thermophoresis so as to form a soot layer 12a of a predetermined thickness.

During this sooting step, moistures, which are impurities existing in the deposition tube 10, are reacted with Si exposed on the surface of the soot 12 to form Si—OH bond or be physically absorbed to the surface of the soot 12, similar to the conventional MCVD. The moistures physically absorbed to the surface of the soot 12 are evaporated at a temperature of 150° C., so they are out of question. However, the Si—OH bond is relatively stable, so it is not disconnected even at a high temperature over 800° C. In addition, since dispersion of residual moistures generates new Si—OH bonds, the hydroxyl groups are hardly removed.

As mentioned above, hydroxyl groups cause serious absorption loss at a wavelength of 1385 nm. Thus, in order to accomplish the aim of the present invention, a method for controlling concentration of hydroxyl groups should be devised. In this point of view, the present invention executes a separate dehydration step with the use of dehydration gas having chemical attraction to silicon after the sooting step. The dehydration step will be described later in detail.

However, for the efficient dehydration step, pores in the soot layer 13a acting as a dispersion route of dehydration gas should be not eliminated, so it is preferred that the sooting step does not cause sintering of the soot layer 12a. In this reason, the flame providing unit 14 gives a temperature condition which is lower than 1600° C., which is a general sintering temperature of the soot layer 12a, but sufficient for oxidation reaction of the soot generation gas. Preferably, the sooting step is conducted at a temperature of 1400~1600° C. in the present invention. Accordingly, the soot layer 12a formed in this sooting step may maintain the pores. The presence of pores in the soot layer 12a means that the radius of curvature of the soot 12 has a positive value, so the soot layer 12a shows a state suitable for removing hydroxyl groups.

Figure 4B:
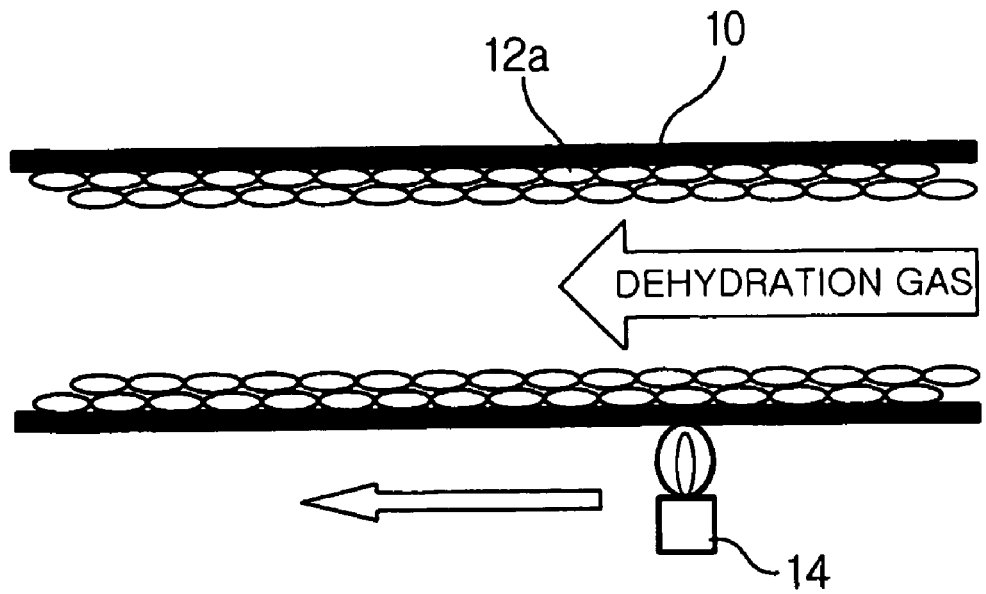

FIG. 4b shows a dehydration step executed for removing hydroxyl groups in the soot layer 12a in the method of manufacturing an optical fiber preform according to the present invention.

Referring to FIG. 4b, in the dehydration step, a mixed gas including dehydration gas and carrier gas is put into the deposition tube 10 in order to remove hydroxyl groups from the soot layer 12a. In an embodiment of the present invention, the dehydration gas adopts chlorine gas, and the carrier gas uses helium gas and oxygen gas, but not limitedly.

If the mixed gas including chlorine gas is put into the deposition tube 10 as mentioned above, the chlorine gas is dispersed into the soot layer 12a through the pores existing in the soot layer 12a, thereby causing the dehydration reaction on the surface of the soot 12 as shown in the following reaction formula 2. The dehydration reaction according to the reaction formula 2 is more effective to disconnect Si—OH bond as the concentration of chlorine gas is greater, the reaction temperature is higher and the reaction time is longer.

Reaction Formula 2

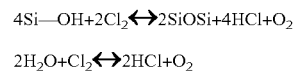

$2H_2O+Cl_2 \leftrightarrow 2HCl+O_2$

The removal of hydroxyl groups by the chlorine gas is preferably conducted at a temperature lower than 1200° C. where the soot layer 12a starts sintering. At a temperature over 1200° C., the soot layer 12a is partially sintered so that pores existing in the soot layer 12a are reduced, thereby also reducing space where the chlorine gas may exist. In addition, if the surface of the soot layer 12a is melt to clog the pores, the dispersion of the chlorine gas into the soot layer 12a may be thoroughly hindered. Thus, more preferably, the flame providing unit 14 heats the deposition tube 10 at a specific temperature in the range of 900~1200° C. so as to prevent even partial sintering of the soot layer 12a.

Along with the temperature, it is also preferred that the chlorine gas stays in the soot layer 12a for a sufficient time so that the dehydration reaction of the reaction formula 2 is sufficiently proceeded. Thus, a movement rate of the torch 14 is preferably kept lower than 700 mm/min. If the movement rate of the torch 14 is faster than 700 mm/min, the chlorine gas may not experience sufficient dehydration reaction. In addition, in this dehydration step, it is preferable to maintain a total amount of the mixed gas, amount and proportion of each of chlorine gas, which is the dehydration gas, and carrier gas fixedly.

Figure 5:
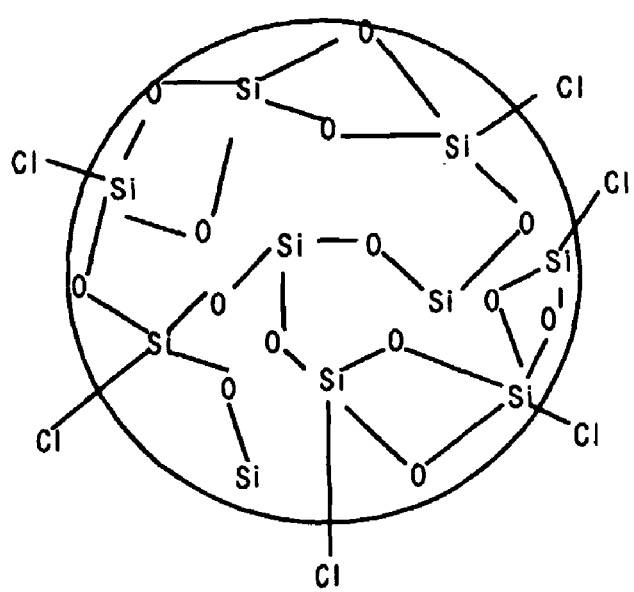
FIG. 5 shows a structure of a soot particle in which hydroxyl groups are removed from the surface of the soot and chlorine is rebounded thereon after the dehydration process of FIG. 4b.
Figure 6:
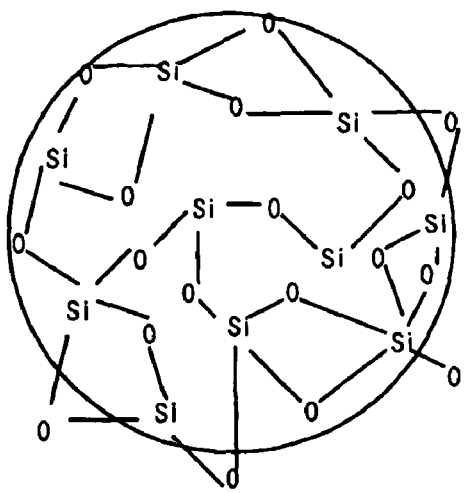
FIG. 6 shows a structure of a soot particle in which hydroxyl groups and chlorine impurities are removed through the dehydration process and the dechlorination process according to the present invention.

After the dehydration step, the hydroxyl groups which have been in the soot layer 12a are removed, but chlorine gas residing in the soot layer 12a and hydrogen chloride gas which is a by-product of the dehydration reaction may be absorbed on the surface of the soot 12, as shown in FIG. 5, so chlorine may be included therein as impurities. Chlorine included as impurities is in form of Si—Cl bond or Cl atom. On the other hand, since chlorine gas and hydrogen chloride gas are also derived as by-products of the reaction in the sooting step shown in FIG. 4a, a small amount of chlorine may be included into the soot layer 12a as impurities even in the sooting step, of course.

Figure 4C:
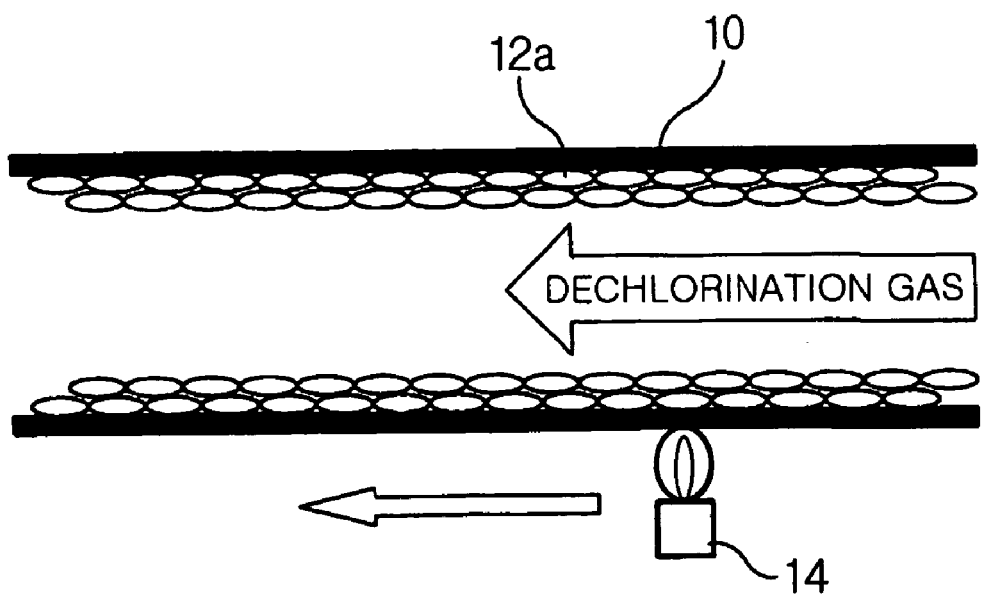

Since the chlorine impurities cause the scattering loss and the microscopic bending loss as described above, the present invention additionally executes a dechlorination step as shown in FIG. 4c before sintering the soot layer 12a in order to remove chlorine impurities included in the soot layer 12a.

Referring to FIG. 4c, in the dechlorination step, while a mixed gas including oxygen gas and carrier gas is put into the deposition tube 10, the flame providing unit 14 heats the deposition tube at a temperature lower than the sintering temperature. As for the mixed gas used in the dechlorination step, oxygen-helium gas or oxygen-nitrogen gas may be used.

In the dechlorination step, the flame providing unit 14 may heat the deposition tube 10 at a temperature higher than the process temperature of the dehydration step as much as 50° C. and lower than 1200° C. Generally, an energy required for disconnecting Si—Cl bond to make Si—O bond in the dechlorination step is over 10 times of the energy required for disconnecting hydrogen bond between $H_2O$ and Si—OH or disconnecting a bond of O—H. Thus, the process temperature of the dechlorination step is preferably kept higher than the case of the dehydration step as much as about 50° C. so as to supply more thermal energy. In addition, if the dechlorination step is conducted at a high temperature over 1200° C., the pores existing in the soot layer 12a may be clogged to deteriorate the efficiency of the dechlorination reaction itself. Thus, the dechlorination step is preferably conducted at a temperature lower than 1200° C., where the sintering starts, similar to the dehydration step.

In the dechlorination step, a movement rate of the flame providing unit 14 is preferably kept lower than 700 mm/min so that the mixed gas including oxygen gas may sufficiently remove chloride residing after the dehydration step. If the movement rate of the flame providing unit 14 is faster than 700 mm/min, the chlorine impurities may not be removed sufficient. In this dehydration step, it is preferable to maintain a total amount of the mixed gas, amount and proportion of each individual gas fixedly.

Figure 4D:
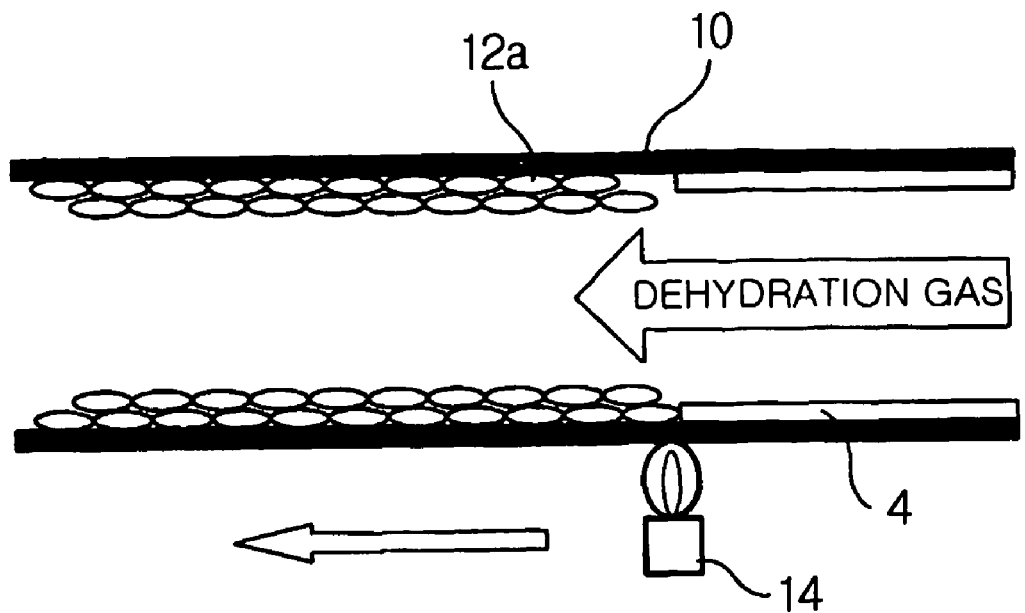

FIG. 4d shows a sintering step executed after the sooting, dehydration and dechlorination steps in the method of manufacturing an optical fiber preform according to the present invention.

Referring to FIG. 4d, in the sintering step, the flame providing unit 14 heats the deposition tube 10 at a high temperature above 1700° C. to sinter the soot layer 12a. At this time, gas for making oxidation condition for sintering is put into the deposition tube 10 together with inert carrier gas. In an embodiment of the present invention, the gas for making oxidation condition is oxygen gas, and the inert carrier gas is helium, but not limitedly. In this sintering step, it is preferable to maintain a total amount of the mixed gas, amount and proportion of each individual gas fixedly.

Since all steps before the sintering step are conducted below the sintering temperature, the soot layer 12a is still porous. However, the porous particles receive heat at a high temperature above 1700° C. in the sintering step so they are vitrified. At this time, a movement rate of the flame providing unit 14 is preferably kept lower than 700 mm/min so that the sintering reaction is sufficiently conducted.

In the sintering step, it is possible to further remove hydroxyl groups, which are not removed in the above-mentioned dehydration step, by putting chlorine gas into the deposition tube 10 again. Since the inside of the deposition tube 10 is under the oxidation condition due to the oxygen gas acting for dechlorination reaction in the sintering step, it is possible to prevent chlorine impurity from being included in the soot layer 12a though the chlorine gas is further supplied.

If executing the sooting, dehydration, dechlorination and sintering steps, one layer of clad is formed, thus such process is repeated until the clad has a desired thickness.

In addition, after the clad has a desired thickness, a core is formed by executing the sooting, dehydration, dechlorination and sintering steps with setting proportion of the soot generation gas differently. If the core is generated to a predetermined thickness, an optical fiber preform is obtained.

Figure 1:
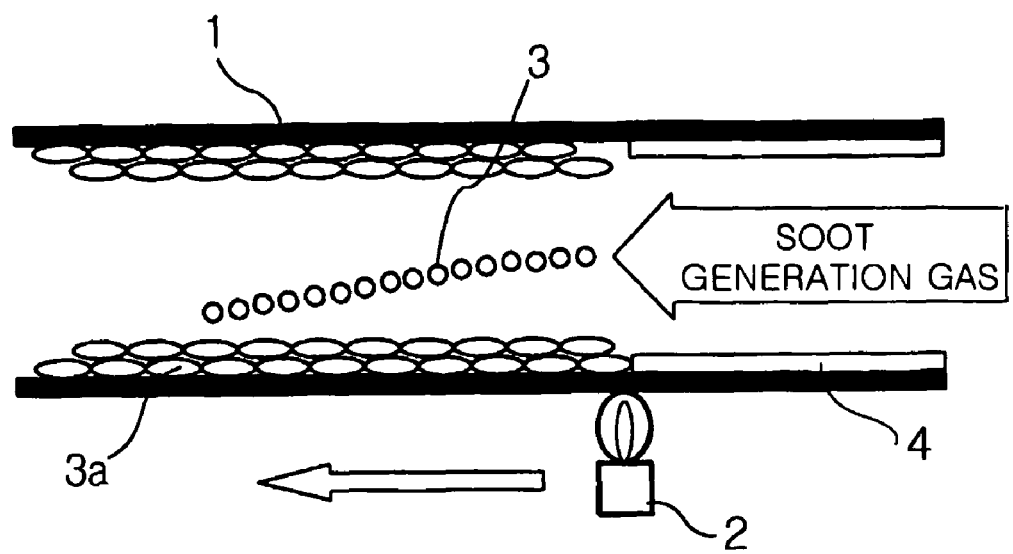
FIG. 1 is for illustrating a method of manufacturing an optical fiber preform using the Modified Chemical Vapor Deposition (MCVD) according to the prior art.
Figure 2:
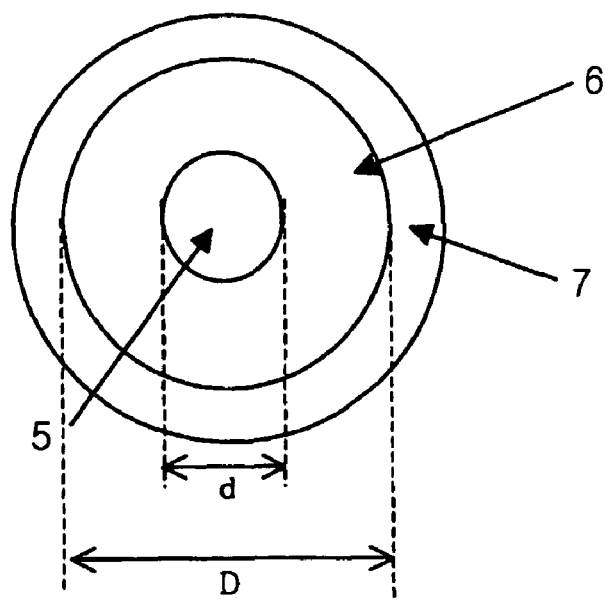
FIG. 2 is a sectional view showing an optical fiber preform manufactured by the conventional MCVD.
Figure 3:
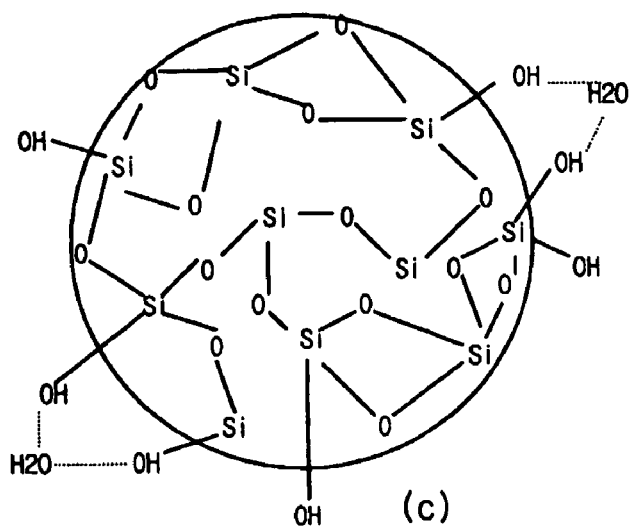
FIG. 3 shows a structure of a soot particle in which hydroxyl groups are bonded on a surface of the soot generated in the conventional MCVD.

When manufacturing an optical fiber preform according to the present invention, a diameter ratio (D/d) of the core 5 (see FIG. 3) and the clad 6 (see FIG. 3) is preferably kept in the range of 2.0~2.5.

Generally, an amount of deposited materials is in proportion to $(D/d)^2$. Considering this fact, the diameter ratio (D/d) of the core 5 and the clad 6 is desirable as it is lower. However, a thickness of the clad should exceed a certain level in order to prevent hydroxyl groups from being dispersed into the core. Thus, when considering two factors such as reduction of deposition materials and restraint of hydroxyl group dispersion at the same time, the diameter ratio (D/d) of the core and the clad is preferably kept in the range of 2.0~2.5.

If manufacturing an optical fiber preform according to the present invention as mentioned above, a content of hydroxyl group and chlorine is diminished lower than 1 ppb, thereby dramatically improving problems of the optical absorption loss due to hydroxyl group and the optical scattering loss due to chlorine.

In addition, the optical fiber preform obtained through the above procedure is then manufactured into an optical fiber through a collapse process and a drawing process. At this time, since the outer surface of the optical fiber preform contains various impurities, it is preferable to etch the surface over 1.0 mm in thickness. In fact, the outer surface of the optical fiber preform shows the greatest content of hydroxyl groups in the optical fiber preform due to the heating of the flame providing unit 14, and the outer surface is also exposed to various environmental impurities. Thus, the outer surface of the optical fiber preform is chemically etched with the use of hydrofluoric acid (HF), which is a chemical material capable of melting silica, thereby removing various impurities and several ppb of hydroxyl groups existing in the surface of the optical fiber preform.

Figure 7:
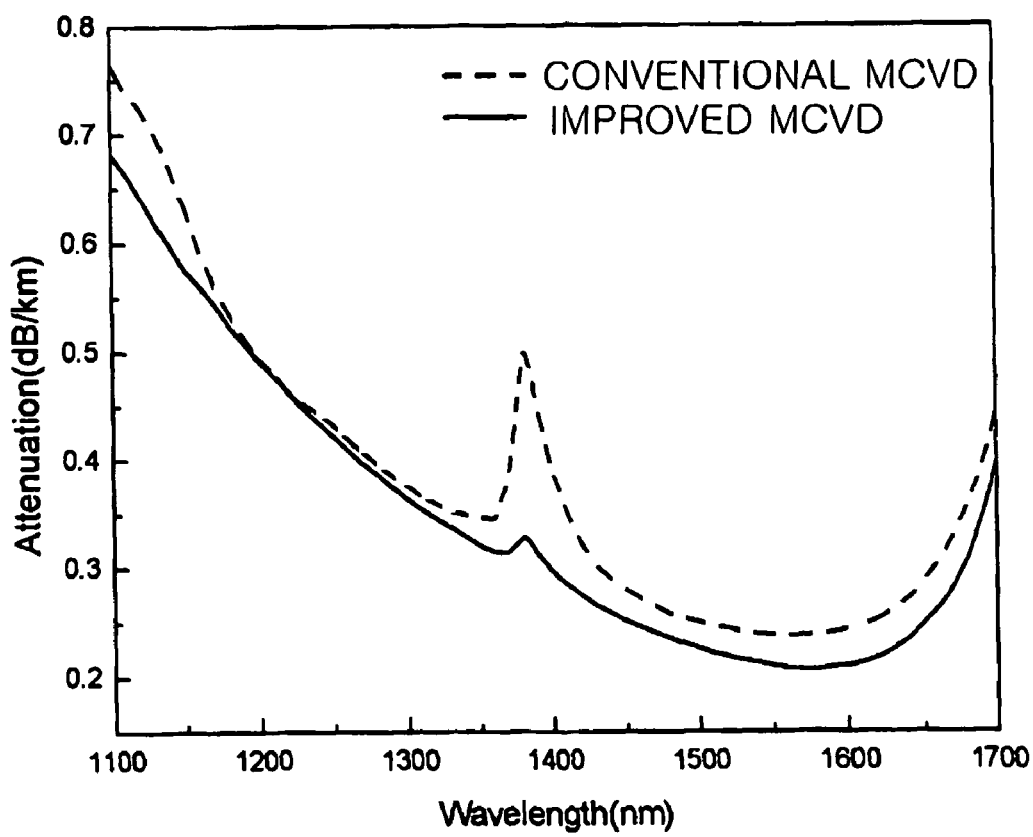
FIG. 7 is a graph comparatively showing absorption losses according to the wavelength for an optical fiber drawn from an optical fiber preform manufactured by the prior art and an optical fiber drawn from an optical fiber preform manufactured according to the present invention.

FIG. 7 is a graph comparatively showing optical losses in the overall wavelength range of 1100 nm~1700 nm generated from an optical fiber drawn from an optical fiber preform manufactured by the present invention and an optical fiber drawn from an optical fiber preform manufactured according to the prior art. In the figure, the loss at the conventional optical fiber is shown by a dotted line and the loss at the optical fiber of the present invention is shown by a solid line.

Referring to FIG. 7, it is seen that the optical fiber manufactured by the conventional MCVD shows high optical loss over the whole wavelengths, and particularly a loss at a wavelength of 1385 nm is so high to be inadequate for usage. However, the optical fiber manufactured by using the improved MCVD of the present invention shows a peak of hydroxyl group absorption loss at a wavelength of 1385 nm less than 0.33 dB/Km, and optical losses due to the scattering at 1310 nm and 1550 nm are also lower than 0.34 dB/Km and 0.20 dB/Km respectively. Thus, it would be understood that the optical fiber manufactured using the improved MCVD of the present invention shows more improved optical transmission characteristics than a conventional signal-mode optical fiber.

Since the optical fiber manufactured by the present invention shows an optical loss of 0.34 dB/Km at a wavelength of 1280 nm and an optical loss of 0.20 dB/Km at a wavelength of 1620 nm, it is possible to additionally obtain wavelength ranges of 1280 nm~1310 nm and 1550 nm~1620 nm as an optical fiber usable wavelength range, compared with the conventional optical fiber.

INDUSTRIAL APPLICABILITY

According to the present invention, it is possible to manufacture an optical fiber preform in which an optical absorption loss due to hydroxyl groups at a wavelength of 1385 nm is reduced less than 0.33 dB/Km by applying the dehydration step after the sooting step, and contents of hydroxyl group and chlorine are lowered below 1 ppb by applying the dechlorination step for removing chlorine impurities absorbed into the soot layer in the dehydration step.

An optical fiber made from the optical fiber preform manufactured by the present invention shows not only an optical absorption loss lower than 0.33 dB/Km at a wavelength of 1385 nm but also an optical scattering loss less than 0.34 dB/Km at a wavelength of 1310 nm and an optical scattering loss less than 0.20 dB/Km at a wavelength of 1550 nm. Accordingly, the optical fiber manufactured by the present invention may be used in the wavelength ranges of 1280 nm~1310 nm and 1550 m~1620 nm, which cannot be used in the prior art, so it is possible to obtain additional wavelength ranges more than 100 nm.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An optical fiber drawn from optical fiber preform manufactured by a method using MCVD (Modified Chemical Vapor Deposition) which forms a clad and a core in a deposition tube by using a flame providing unit reciprocating along an axial direction of the deposition tube, the method repeatedly executing the following process with varying composition of soot generation gas according to a refractive index profile, in which the process comprises the steps of:

(a) forming a soot layer having pores on an inner surface of the deposition tube by inducing soot generation reaction at a temperature lower than a soot sintering temperature with putting soot generation gas in a halide group together with oxygen gas in the deposition tube;

(b) removing hydroxyl groups existing in the soot layer with keeping the pores by putting dehydration gas into the deposition tube;

(c) removing chlorine impurities existing in the soot layer with keeping the pores by putting dechlorination gas into the deposition tube; and (d) sintering the soot layer by heating the deposition tube at a temperature above the soot sintering temperature, wherein a peak of hydroxyl group absorption loss at 1385 nm is less than 0.33 dB/Km, an optical loss at 1310 nm is less than 0.34 dB/Km, an optical loss at 1550 nm is 0.20 dB/Km, and a concentration of hydroxyl group and chlorine impurities is less than 1 ppb.

2. An optical fiber according to claim 1, wherein the step (a) is accomplished at a temperature lower than 1600° C.

3. An optical fiber according to claim 1, wherein the step (a) is accomplished at a temperature selected in the range of 1400~1600° C.

4. An optical fiber according to claim 1, wherein the step (b) is accomplished at a temperature lower than the soot sintering temperature.

5. An optical fiber according to claim 4, wherein the step (b) is accomplished at a temperature lower than 1200° C.

6. An optical fiber according to claim 4, wherein the step (b) is accomplished at a temperature selected in the range of 900~1200° C.

7. An optical fiber according to claim 1, wherein in the step (b) the flame providing unit moves at a rate lower than 700 mm/min.

8. An optical fiber according to claim 1, in the step (b), wherein the dehydration gas is chlorine gas, and wherein the chlorine gas is mixed with inert carrier gas and then the mixed gas is supplied into the deposition tube.

9. An optical fiber according to claim 1, wherein the step (c) is accomplished at a temperature lower than the soot sintering temperature.

10. An optical fiber according to claim 1, wherein the step (c) is accomplished at a temperature higher than the process temperature of the step (b) as much as 50° C. and lower than 1200° C.

11. An optical fiber according to claim 1, wherein in the step (c) a movement rate of the flame providing unit is kept lower than 700 mm/min.

12. An optical fiber according to claim 1, in the step (c), wherein the dechlorination gas is oxygen gas, and wherein the oxygen gas is mixed with inert carrier gas and then the mixed gas is supplied into the deposition tube.

13. An optical fiber according to claim 1, in the step (d), wherein gas for making oxidation condition is put into the deposition tube together with dehydration gas in order to sinter the soot layer and remove residual hydroxyl groups in the soot layer at the same time.

14. An optical fiber according to claim 1, wherein the step (d) is accomplished at a temperature higher than 1700° C.

15. An optical fiber according to claim 1, wherein in the step (d), a movement rate of the flame providing unit is kept lower than 700 mm/min.

16. An optical fiber according to claim 1,
wherein the refractive index profile is in correspondence with refractive indexes of the clad and core, and
wherein a diameter ratio of the clad and core (D/d) is determined in the range of 2.0~2.5.

17. An optical fiber drawn from an optical fiber preform manufactured by a method using MCVD (Modified Chemical Vapor Deposition) which forms a clad and core in a deposition tube by using a torch reciprocating along an axial direction of the deposition tube, the method repeatedly executing the following process with varying composition of soot generation gas according to a refractive index profile, in which the process comprises the steps of:
  (a) forming a silica soot layer having pores on an inner surface of the deposition tube by heating the deposition tube at a temperature in the range of 1400~1600° C. with the reciprocating torch with putting soot generation gas in a halide group together with oxygen gas into the deposition tube;
  (b) removing hydroxyl groups existing in the silica soot layer by heating the deposition tube in the range of 900~1200° C. with the torch, which reciprocates at a rate lower than 700 mm/min, with putting a mixed gas including chlorine gas and inert carrier gas into the deposition tube;
  (c) removing chlorine impurities existing in the soot layer by heating the deposition tube higher than the process temperature of the step (b) as much as 50° C. and lower than 1200° C. with the torch, which reciprocates at a rate lower than 700 mm/min, with putting a mixed gas including oxygen gas and inert carrier gas into the deposition tube; and
  (d) sintering the soot layer by heating the deposition tube at a temperature higher than 1700° C. with the torch, which reciprocates at a rate lower than 700 mm/min, with putting a mixed gas including chlorine gas, gas for making oxidation condition, and inert carrier gas into the deposition tube,
wherein a peak of hydroxyl group absorption loss at 1385 nm is less than 0.22 dB/Km, an optical loss at 1310 nm is less than 0.34 dB/Km, an optical loss at 1550 nm is 0.20 dB/Km, and a concentration of hydroxyl group and chlorine impurities is less than 1 ppb.

18. An optical fiber wherein a peak of hydroxyl group absorption loss at 1385 nm is less than 0.33 dB/Kin, an optical loss at 1310 nm is less than 0.34 dB/Km, an optical loss at 1550 nm is 0.20 dB/Km, and a concentration of hydroxyl group and chlorine impurities is less than 1 ppb.

* * * * *